United States Patent Office  3,462,331
Patented Aug. 19, 1969

3,462,331
METHOD FOR MOLDING SEALING GASKETS
Charles W. Simons, Bedford, Mass., assignor to W. R. Grace & Co., Cambridge, Mass., a corporation of Connecticut
Filed Apr. 6, 1966, Ser. No. 540,606
Int. Cl. B29c 1/14
U.S. Cl. 156—231                    4 Claims

ABSTRACT OF THE DISCLOSURE

Sealing gaskets are formed in closures by immersing a heated die face in a mass of a thermoplastic gasket-forming composition (such as a plastisol or a dry blend of a plasticizer and resin) and transferring the shaped composition which adheres to the die to a closure shell. The method permits formation of gaskets in odd shaped closures, such as square, rectangular and triangular elements.

---

This invention relates to closures. In particular, it relates to a method of molding thermoplastic materials as gaskets in closure shells.

The basis of all closures for air-tight containers is to hold the closure firmly against a resilient gasket which seats on the mouth of the container. There are two general methods of forming gaskets in closures. The first consists in depositing a measured amount of liquid gasket-forming composition onto the center of a rotating closure whereby the composition is distributed over the panel section by centrifugal force. While the rotary method produces gasketed closures rapidly, its use is limited to forming gaskets in closures having a circular shape.

The second method involves a molding technique in which a liquid gasket-forming composition is deposited in its center portion of a closure shell, and the composition is shaped over the panel area by a plunger which may or may not be heated. This technique has a number of disadvantages among which is the difficulty of spreading the composition horizonally across the panel by vertical force. This difficulty is decidedly pronounced in forming the gasket in large closures because the force necessary to spread the composition over the area is greater. In addition, the method is not amendable to using gasket-forming compositions which are either in powder form or a very viscous liquid because such materials cannot be satisfactorily metered through dispensing nozzles. A distinct disadvantage in molding liquid materials is that the plunger has a tendency to spatter the composition out of the panel and onto the skirt area. This is particularly objectionable in crown caps because the presence of sealing composition in the fluted skirt area adversely affects the sealing efficiency of the closure.

The present invention provides a method of forming gaskets in container closures which overcomes the drawbacks of the prior art techniques. This method involves providing a heated die having a desired gasket configuration incised on its face, immersing the face of the die in a mass of thermoplastic material whereby the material adheres to the die face, and transferring the resulting design from the die to a closure. The design on the die face may be circular, oval, ellipsoidal, square, triangular, rectangular, etc., and the transferred gasket design conforms to the shape of the closure shell. Thermoplastic materials in a powder or liquid state can be employed because the success of the method depends upon the heat sensitivity of the gasket-forming material and not upon its physical form.

Figure 1:
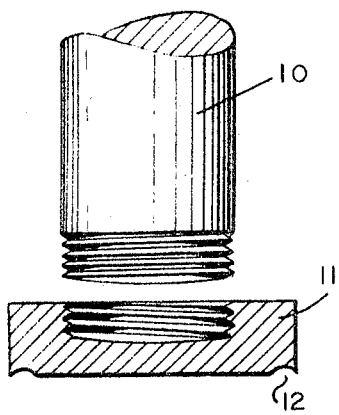
FIG. 1 illustrates a die partly in section composed of a shank arranged for threaded engagement with a die face.
Figure 2:
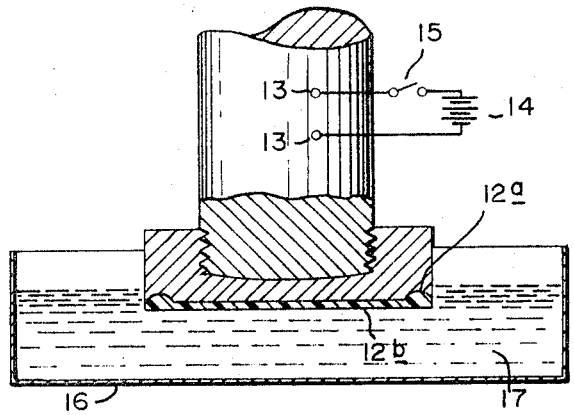
FIG. 2 shows an electrically-heated die immersed in a bath of a liquid gasket-forming composition.

The gasket may be formed from a host of thermoplastic base polymers and include such compositions as plastisols of vinyl chloride homopolymers and copolymers, plasticized vinyl chloride polymers in powder form, powdered polyethylene, powdered ethylene-vinyl acetate copolymers, hot-melt ethylene-vinyl acetate copolymers in powder form, powdered ethylene-ethyl acrylate copolymers, hot-melt ethylene-ethyl acrylate coploymers in powder form and hot-melt polypropylene in powder form. These compositions are generally modified to impart desirable properties by the inclusion of conventional additives such as fillers, coloring agents, stabilizers, etc. Where the gasket-forming composition is in the form of a powder, the heat of the die is sufficient to soften the solid material and cause adhesion to the die face. The softened material is then transferred to the closure shell and pressed by the die to complete the gasket formation.

The amount of composition which adheres to the die face and which is sufficient to form an acceptable gasket is dependent upon the composition itself, the depth of the die face in the composition, the residence time of the die in the mass of the gasket-forming composition and the temperature of the die face. These variables are dependent upon the specific properties of the composition whether in liquid or powder form and the conditions applicable to a particular composition can easily be determined by simple laboratory testing.

While the method is applicable to the use of a variety of compositions to form the gaskets, the invention will be described with respect to that embodiment in which a plastisol of a vinyl chloride polymer is employed as the gasket-forming composition. Basically, these compositions comprise a vinyl chloride polymer dispersed in a plasticizer in which the resin is insoluble at room temperature but which is capable of solvating the polymer at an elevated temperature. Suitable polymers include polyvinyl chloride and vinyl chloride copolymerized with another copolymerizable monomer, such as vinyl acetate.

The plasticizer employed may be any of the well-known plasticizers for vinyl resins which solvate the resin at elevated temperatures. These include such primary plasticizers, such as dioctyl phthalate, diisooctyl phthalate, didecyl phthalate, di(n-octyl, n-decyl) phthalate, acetyl tributyl citrate, dioctyl sebacate, dihexyl adipate, dioctyl adipate, 2-ethylhexyl diphenyl phosphate, and tricresyl phosphate. Polymeric plasticizers, such as polyesters derived from dibasic acids and glycols, may also be used. The percentage of the plasticizer in the composition ranges from about 30 to 150 parts per 100 parts of the vinyl polymer.

In addition to the polymer and plasticizer, various other additives may be included to modify the plastisol composition. These include fillers, such as anhydrous calcium sulfate, talc, wood flour, diatomaceous earth and asbestos; stabilizers, such as tetrasodium pyrophosphate, tribasic lead silicate, calcium stearate, zinc stearate, dibasic lead stearate, organo-tin complexes, epoxy resins and epoxidized oils of fatty acids; pigments, such as carbon black, titanium dioxide and aluminum powder; and dispersing agents, such as zinc resinate, lecithin, glycol stearate, propylene glycol laurate and glycerol monooleate.

Figure 4:
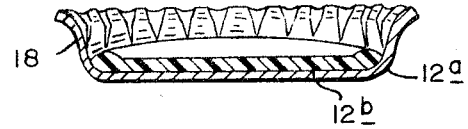
FIG. 4 is a cross-sectional view of the finished gasket affixed in place in a crown closure.

In carrying out the method of this invention, a die composed of a shank 10 having its lower end threaded is assembled with an internally-threaded die face 11. A threaded die is advantageous in that it permits differently-shaped die faces, such as rectangular or triangular shapes, to be interchanged, although it is to be understood that the form which the die takes is not a limitation on the method and, therefore, the shank and die face may be unitary. The die face 11 shown in FIG. 1 is provided with a peripheral channel 12 which is adapted to form a gasket having an annular ring 12a (FIG. 4) integrated with a thin center portion 12b. The die is heated by electrodes 13 which are connected to an electrical heating source 14 by means of switch 15. When plastisols of vinyl chloride polymers are used as the gasket-forming composition, the die is heated to a temperature ranging between about 200 to 400° F.

The heated die face 11 is then immersed in the tank 16 which contains the plastisol bath 17 whereby the heat causes the composition in contact with the die face to flux and adhere thereto. To form a gasket having a raised annular ring integrated with a thin center section, the die face 11 is immersed to a depth sufficient to fill the peripheral channel 12 with composition with a concomitant pick-up of a thin center portion 12b. The heat causes that portion of the plastisol which is in immediate contact with the die face 11 to flux and partially form the gasket and by heat transfer causes the opposite portion of the gasket design to gel. A residence time of the die face in the plastisol bath of between about 1/10 to 5 seconds is sufficient to cause the desired amount of the plastisol to adhere to the die face.

The die is then raised from the plastisol bath, and the partially-formed gasket which adheres to the die face is transferred to a closure shell. These shells are generally formed of tinplate and have a protective coating thereon. The coating may be one which is derived from a lacquer consisting of a vinyl resin alone or in combination with one or more of oleoresinous, epoxy or phenolic components. A suitable coating composition is a lacquer derived from polyvinyl chloride or a major amount of vinyl chloride copolymerized with up to 20% of vinyl acetate in combination with the aforementioned components.

Figure 3:
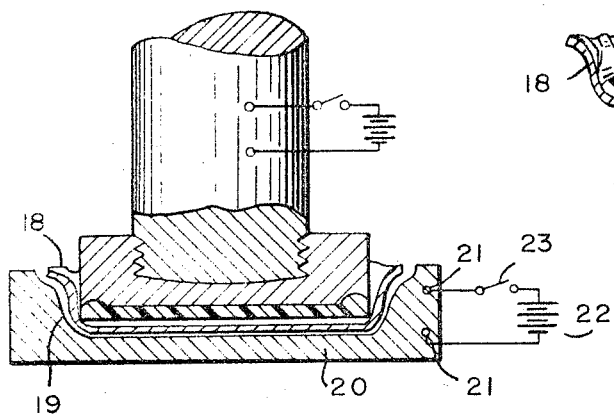
FIG. 3 shows a gasket design being transferred from the die face to a heated crown closure.

In FIG. 3, a closure, such as crown 18 is placed in a groove 19 of a platen 20. The platen is maintained at a temperature of between about 250 to 400° F. by means of electrodes 21 which are energized by a suitable electrical supply source 22 through switch 23. The die carrying the partially-formed gasket is then inserted into the internal surface of the crown 18 and resides therein for about 1/2 to 20 seconds. The temperature of the platen and the residence time of the die are sufficient to convert the partially-formed gasket to a solidified cohesive form.

As an alternative, the platen 20 may be unheated, and this step of the method may be employed simply to mold and affix the gasket in place in the closure shell. The die is then withdrawn, and the closure containing the gasket is moved to a suitable heating medium, such as infrared radiation or an oven, to complete the fluxing cycle of the gasket.

The invention is further illustrated by the following examples:

Example 1

A plastisol composed of the following ingredients was prepared:

Parts by wt.
Polyvinyl chloride (molecular weight c. 89,000) ___ 100
Dioctyl phthalate _____ 75

A gasket for a crown closure was prepared by immersing a die face heated to a temperature of 270° F. in the plastisol bath. The die face resided in the bath for 1/4 second whereby sufficient plastisol adhered to the face to form a partially-fluxed gasket. The gasket was then transferred to the closure which was mounted on a platen heated to a temperature which ranged between 290° F. to 320° F. The gasket was shaped by applying a total die thrust of 153 pounds over a 5-second period.

Carbonation tests on gasketed closures thus formed were carried out on a laboratory scale using glass bottles filled with a standard sulfuric acid solution to obtain the desired carbonation and adding sodium bicarbonate in gelatin capsules to delay reaction for a few minutes. The amounts of sulfuric acid solution and bicarbonate were sufficient to develop three gas volumes of carbon dioxide.

Five bottles containing three gas volumes of carbonation were capped with crowns having gaskets prepared according to this example, and the capped bottles were stored for 17 days at 100° F. The retained gas volume after this storage period was 2.7. This compared favorably with like bottles sealed with a closure having a gasket prepared by known commercial techniques and which retained 2.6 volumes of gas.

A second test was carried out with the gaskets formed according to this example on 17 bottles which were stored for one month at 100° F. The average volume of gas retained was 2.9.

In addition, the method described in this example yielded gaskets having reproducible film weights. The average weight of 19 gaskets was 153 milligrams, and the weight of the individual gaskets ranged from a low of 141 to a high of 166 mgs. The weight of most gaskets ranged between about 147 to 157 mgs.

Example 2

A powdered plasticized vinyl chloride polymer was prepared by blending 60 parts by weight of dioctyl phthalate with 100 parts by weight of coarse polyvinyl chloride. The polymer had a particle size of 100% through a 40-mesh screen and 5% through a 100-mesh screen and a capacity of absorbing monomeric plasticizers in concentrations of up to 100 parts by weight plasticizer per hundred parts by weight of polymer. The plasticizer was stirred into the resin and formed a moist powder which was then dried by heating at 150° F. for 1/2 hour.

A die face heated to a temperature of 340° F. was immersed in the powdered composition for 1/3 second and to a depth sufficient to cover the die face. The powder melted almost instantaneously upon contact with the die face. The die was then inserted into a crown closure which was mounted on a platen heated to a temperature of 370° F. The gasket was formed in place by exerting a die pressure of 153 lbs. for 5 seconds. The resultant gasket was a resilient cohesive mass.

As thus described, the present invention has the advantage over known commercial techniques of molding gaskets in closures in that the shape of the closure is not a limitation on the method. In addition, powders can be used to form the gaskets without imposing any disadvantage on the method. This is a distinct advance in the art because prior techniques required the use of nozzles to dispense the composition into the closure. Experience has proven that powdered compositions could not be metered satisfactorily due to the inability of the nozzle to deliver constant amounts of powder. This resulted from a progressive build-up of powder on the internal walls of the nozzle. This disadvantage is completely avoided by the present method because it does not depend upon any dispensing device to deliver the powder. It is simply picked up from a mass by immersing the heated die into it.

I claim:

1. A method of forming sealing gaskets in container closures which comprises providing a mass of a thermoplastic gasket-forming composition, immersing a die having a gasket design on its face in the composition for a residence time of about 1/10 to 5 seconds and to a depth sufficient to cause an amount of composition to adhere to the die face conforming to the gasket design, said die being heated to a temperature ranging between about 200 and 400° F. prior to immersion in the composition, transferring the adhered gasket design from the die to a closure shell heated at about 250 to 400° F. and retaining the die in the closure for about ½ to 20 seconds.

2. A method according to claim 1 wherein the gasket-forming composition is a plastisol of a vinyl resin.

3. A method according to claim 1 wherein the composition is a powdered plasticized vinyl resin.

4. A method according to claim 2 wherein the resin is a vinyl chloride polymer.

References Cited
UNITED STATES PATENTS

| | | | |
|---|---|---|---|
| 3,074,810 | 1/1963 | Timson | 117—43 |
| 3,101,992 | 8/1963 | Cooke et al. | 264—268 |
| 3,212,131 | 10/1965 | Aichele | 18—5 |

EARL M. BERGERT, Primary Examiner

M. L. KATZ, Assistant Examiner

U.S. Cl. X.R.
156—262; 264—268